United States Patent [19]
Parker et al.

[11] Patent Number: 5,213,058
[45] Date of Patent: May 25, 1993

[54] RECOVERABLE AQUACULTURE HABITAT UTILIZING PNEUMATIC TIRE CASINGS

[76] Inventors: Robert S. Parker, 205 Tours St., Lafayette, La. 70506; C. A. Yundt, 415 Schlief Dr., Belle Chasse, La. 70053

[21] Appl. No.: 632,384

[22] Filed: Dec. 24, 1990

[51] Int. Cl.⁵ .............................................. A01K 61/00
[52] U.S. Cl. ......................................................... 119/2
[58] Field of Search .................... 119/2, 3, 4; 405/28, 405/26, 23, 35, 16

[56] References Cited

U.S. PATENT DOCUMENTS

| | | | |
|---|---|---|---|
| 3,675,626 | 7/1972 | Down | 119/4 |
| 3,755,829 | 9/1973 | Walklet | 405/35 X |
| 3,928,701 | 12/1975 | Roehner | 405/16 X |
| 4,095,560 | 6/1978 | Laurie et al. | 119/3 |
| 4,188,153 | 2/1980 | Taylor | 405/34 |
| 4,196,694 | 4/1980 | Buchanan | 119/4 X |

FOREIGN PATENT DOCUMENTS

| | | | |
|---|---|---|---|
| 995717 | 2/1983 | U.S.S.R. | 119/3 |
| 1329712 | 8/1987 | U.S.S.R. | 119/3 |

*Primary Examiner*—Gene Mancene
*Assistant Examiner*—Thomas Price

[57] ABSTRACT

An artificial stone crab habitat is constructed of used pneumatic tire casings which are modified to allow easy access for harvesting and cleaning operations. Multiple tire casings are stacked and tethered together with a rope or cable harness.

19 Claims, 2 Drawing Sheets

RECOVERABLE AQUACULTURE HABITAT UTILIZING PNEUMATIC TIRE CASINGS

BACKGROUND OF THE INVENTION

1. Field of the Invention

This invention is concerned with the culture of stone crabs, other crustaceans and other aquatic species. More particularly, it is concerned with the use of pneumatic tire casings in aquatic environments to provide a habitat for stone crabs, other crustaceans and other aquatic species.

2. Description of the Prior Art

Stone crabs, i.e., Menippe sp., provide an important commercial fishery in some coastal areas. For example, in Florida, the value of the stone crab catch in 1980–81 was about $5,000,000.

The commercial harvest of the stone crab and other crustaceans that exhibit cryptic habits has heretofore been dependent upon the recovery of baited traps placed in known crustacean habitats. The harvesting of stone crabs is particularly unique in that, by law, declawed crabs are returned to their environment where 70% of them survive the declawing process and; therefore, may reproduce and regenerate new, harvestable claws.

Studies and anecdotal accounts suggest a fundamental requirement by stone crabs for substrate suitable for refuge. This habitat criterion can be met by burrowing into sand-shell mix or by using available hard cover. A method of providing additional suitable habitat for stone crabs should serve to increase the number of stone crabs available for harvesting.

The reuse/recycling of used or off specification pneumatic tire casings has always presented severe environmental and economic problems to potential markets. The use of such materials in the establishment of artificial reefs is well known and documented. Such reuse, although of some economic benefit, does not exploit to the fullest the potential aquatic habitat provided for in the troughs of these tire casings.

There is a need to create artificial marine habitats to support the commercial harvesting of stone crabs and other crustaceans. There is also a pressing requirement for environmentally and economically sound methods of recycling used or off specification pneumatic tire casings.

It is therefore the object of the present invention to provide valuable habitat to stone crabs and other commerically important aquatic species.

It is a further object of the present invention to provide an environmentally safe and economically sound method of reusing used or off specification pneumatic tire castings.

It is yet another object of the present invention to modify and arrange used or off specification pneumatic tire casings in such a manner as to provide readily recoverable, valuable habitat for the harvesting of stone crabs and other aquatic species.

SUMMARY OF THE INVENTION

In the present invention, pneumatic tire casings are modified, rotated 90 degrees with respect to their normal "in use" position, vertically stacked, and tethered together to provide useful habitat in marine environments for stone crabs, and to facilitate the harvesting of the stone crabs utilizing the tire casing habitat. (The term "stone crabs" will hereinafter also be used to refer to, in addition to stone crabs, other valuable crustaceans).

The modifications include the cutting of holes in one or both tire casing sidewalls. The holes serve to facilitate the cleaning of the pneumatic space of the tire casings and to help provide for the suspension via a harness, elements of which pass through said holes, of vertical stacks of the modified tire casings in marine environments. A multi-level habitat for stone crabs is thus created.

In the preferred embodiment of the invention, only the bottom or face down sidewall is perforated with holes. The top or face up sidewall is partly or wholly removed along a circumference near the tire tread wall/sidewall interface. The rotation, stacking, and tethering is then accomplished as above.

The stacked configuration of the habitat is the preferred configuration of the habitat in immersed service. The suspended configuration of the habitat is the preferred configuration of the habitat during harvesting and cleaning operation. The suspended configuration is also suitable for immersion service.

DETAILED DESCRIPTION OF THE INVENTION

Figure 1:
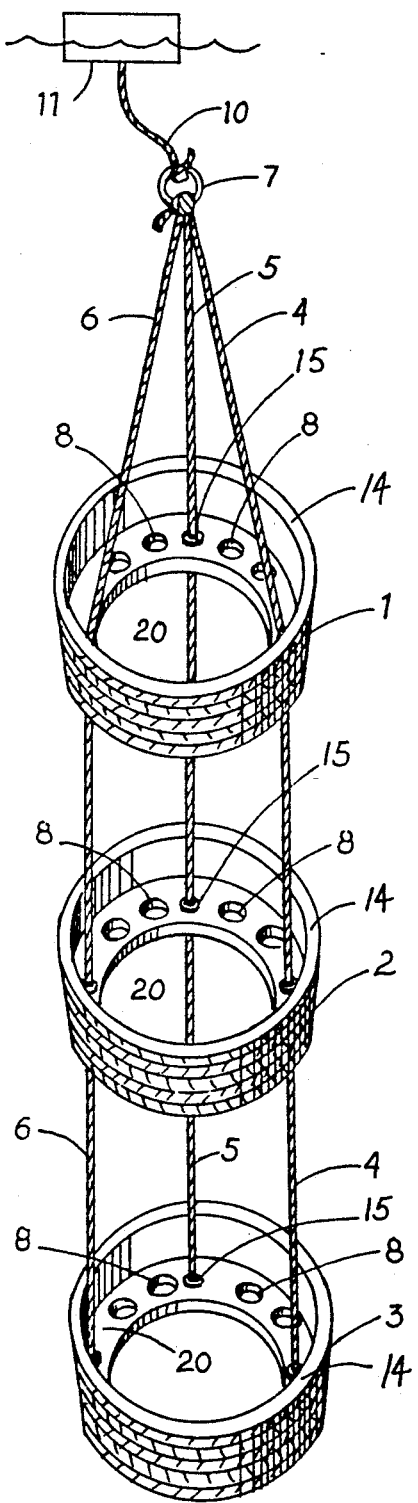
FIG. 1 is a top perspective view of the invented stone crab habitat as it appears in its suspended configuration with the upper side walls removed from the tire casings.
Figure 2:
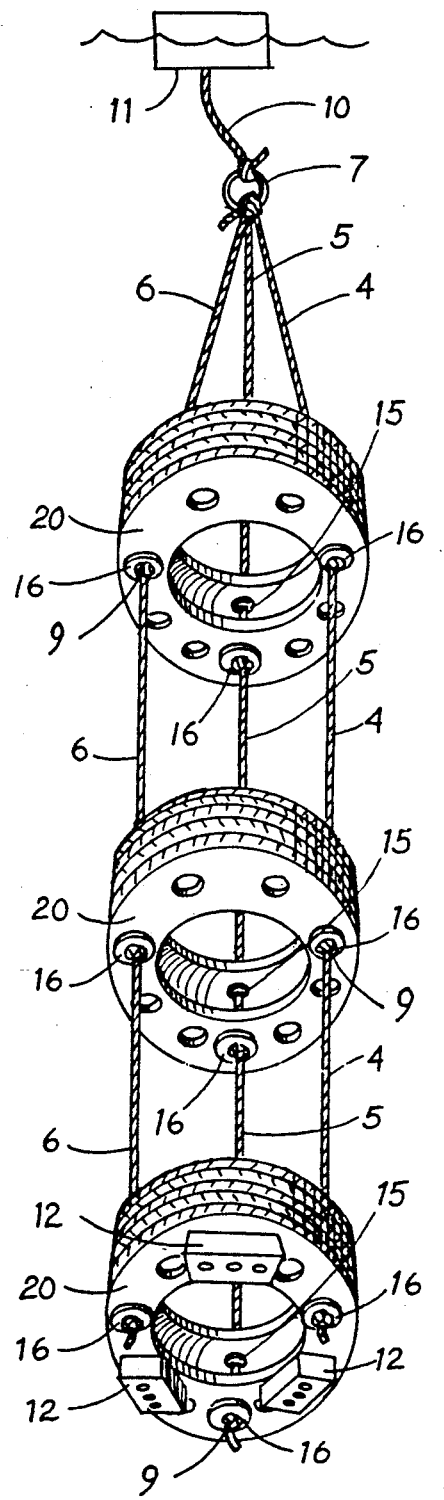
FIG. 2 is a bottom perspective view of the stone crab habitat shown in FIG. 5.

A detailed description of a preferred embodiment of the invention follows:

Referring to FIGS. 1 and 2, the stone crab aquacultural habitat comprised of used tire casings 1, 2, and 3 is shown in a suspended vertical configuration which is as it would normally appear before habitat enhancing materials are placed within the pneumatic space and before installation into a marine environment. The stone crab habitat shown in the figures is comprised of three used tire casings for illustrative purposes only.

It will be obvious to one skilled in the art that more than or fewer than three tire casings can be used to construct a stone crab habitat.

The suspended configuration is suited for harvesting and cleaning since the suspension makes the pneumatic space of each tire casing 1, 2, and 3 easily observable and easily reachable.

The used tire casings 1, 2, and 3 are rotated 90 degrees with respect to their normal "in use" configuration (i.e., diameter of each tire casing is in the horizontal). The bottom, or face down, sidewall 20 of each of the three tire casings, 1, 2, and 3 is perforated to provide holes 8. The number and size of the holes will vary in accordance with the type of harness materials utilized (see below) and the site specific hydrological/sedimentary characteristics. Holes 8 are positioned in such a manner as to facilitate sediment and detritus flushing from the pneumatic space when the tire casings 1, 2, and 3 are lifted for harvesting. A typical number of holes 8 per casing 1, 2 and 3 would be 7 (seven) to eight (8) holes. Typical hole sizes would be 2.25 inches and 1.00 inch for drain/cleaning holes and harness holes, respectively.

Figure 5:
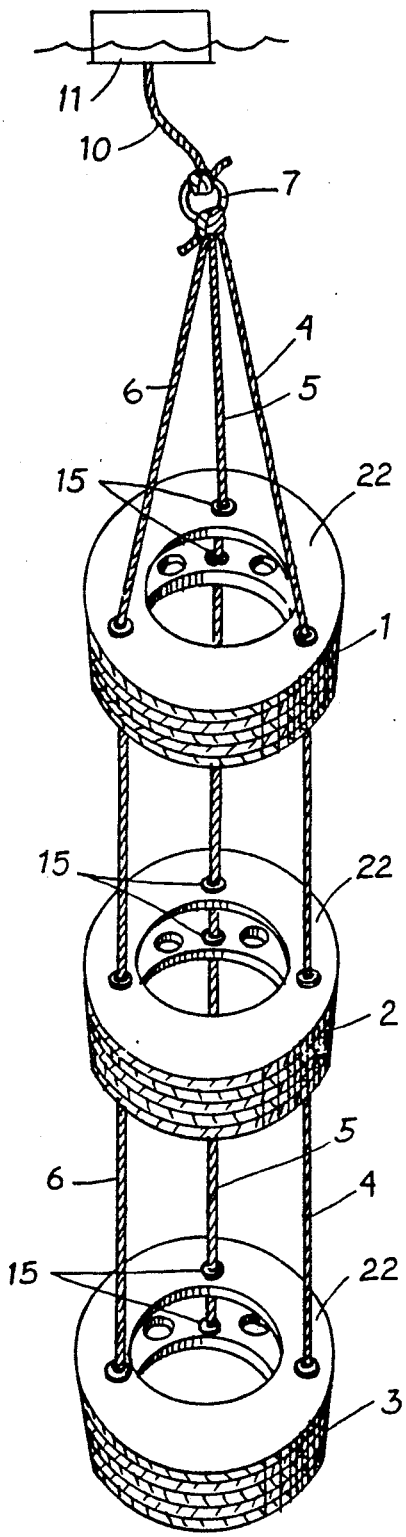
FIG. 5 is a top view of an alternative embodiment of the stone crab habitat as it would appear in its suspended configuration showing the top and bottom side walls of each tire casing still in place.

The top, or face up sidewall 22, of each of the tire casings 1, 2, and 3 may be perforated as shown in FIG. 5 to provide holes 8 as was done with the bottom sidewalls described above. Alternatively, the top sidewalls may be either partially or wholly removed (as shown in FIG. 1) along a circumference near the tread wall-/sidewall interface in such a manner as to leave a lip or edge 14 in the event the used tire casings are stacked (as described below). The preferred embodiment is to remove part or all of the top or face up sidewall 22 as described. This preferred procedure adds to the cost of modifying the tire casings 1, 2, and 3 but it substantially improves the efficiency of harvesting and cleaning operations. The modification also increases the amount of living space available to the stone crabs when the habitat is in the stacked configuration normally used during immersion service.

Figure 4A:
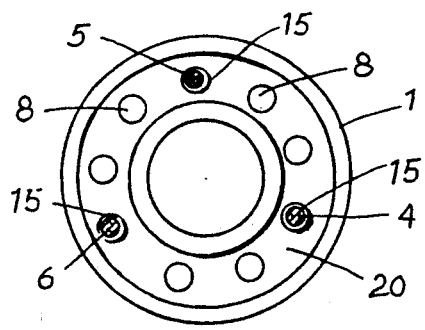
FIGS. 4A and 4B, respectively, are top views of the stone crab habitat before and after the placement of habitat enhancing materials within the pneumatic space.
Figure 4B:
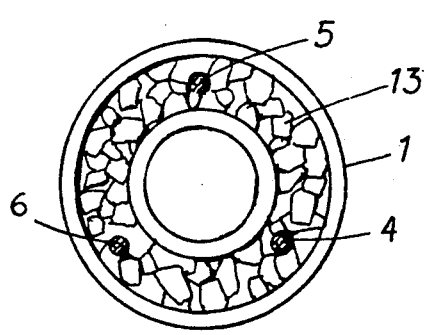

Referring to FIG. 4, habitat enhancing materials 13, such as the valves of clams, oysters or other hard such as stone or bricks, are shown placed into the pneumatic space of each tire. Such hard materials not only provide the stone crabs with cover, but it also provides secondary species and fouling organisms such as those typical of an oyster bed community with substrate to which they can attach. These other "community" members provide the target crustaceans with sustenance.

A harness assembly is used to effect vertical suspension of the tire castings 1, 2, and 3 and to provide for stability of the multi-level stone crab habitat created by the tire casings. To provide for installation of such a harness assembly, three of the holes 8 placed in the bottom sidewall of the tire casings 1, 2, and 3 by the modifications described above are used to afford passage through the tire casing of ropes, metallic cable or similar means (hereinafter referred to as "ropes") which comprises the elements of the harness. The selected holes 8 in the tire casings through which the ropes 4, 5, and 6 are passed are about 120 degrees apart and should be equipped with grommets 15 in the event that steel belted tires are utilized in the fabrication process. This addition will greatly reduce the abrasive effects of the steel wires on the harness ropes. More or fewer than three ropes can be used for the harness.

Knots or stops 9 are affixed at strategic intervals along the ropes so that when the habitat is recovered from its normal immersed configuration (FIG. 3), the individual tire casings 1, 2, and 3 are supported by the knots or stops 9 and therefore suspended at the intervals selected (FIGS. 1 and 2). In addition, washers 16 or other large surface area device (e.g., strips of metal, conduit, etc.) should be placed between the knots or stops to reduce the likelihood of a knot or stop "pull through" of the sidewall harness mounting holes 8 and increase the useful life of the habitat.

The intervals between the suspended tire casings 1, 2, and 3 are selected to facilitate harvesting and cleaning of the pneumatic spaces of the tire casings 1, 2, and 3. A typical interval between tires would be 3 feet.

The harness ropes 4, 5, and 6 are attached to a loop 7 to which a recovery hook (not shown) could be attached. During immersion operation, the loop 7 is affixed to a float line 10 which is, in turn, affixed to a float 11.

Figure 3:
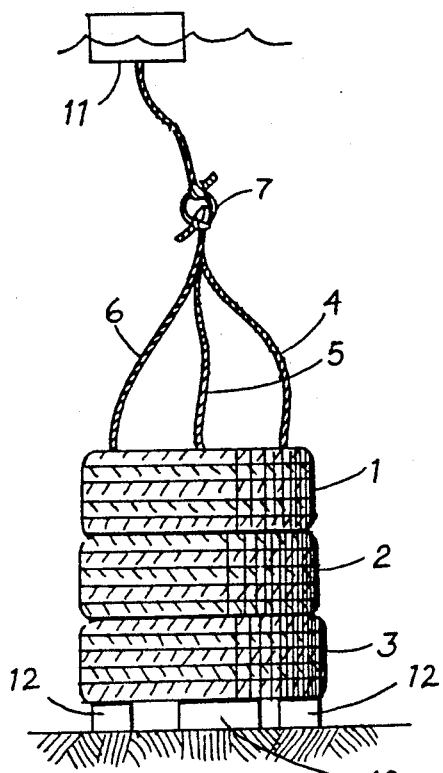
FIG. 3 is an elevation view of the stone crab habitat of FIGS. 1 and 2 as it would appear in its stacked or immersed service configuration on the water bottom.

During immersion service, i.e., during the time the used tire casings 1, 2, and 3 serve as a stone crab habitat, the stacked configuration habitat shown in FIG. 3 is preferred. In the stacked configuration, the tire casings are allowed to rest atop one another via the lip 14. On the bottom most casing 3 or more spacers 12, e.g., three-hole bricks, are affixed to prevent casing 3 from contacting the marine body floor so as to allow for the benthic dwelling crustaceans easy access into the habitat.

The stone crab habitat may be deployed in brackish or marine embayments. To insure that the habitat does not move significant distances, the habitat may be affixed to pilings, etc.

EXAMPLE

In March, 1989, the invention was field tested as herein described. Two, two-tire, double-decked habitats, stacked and tethered as described above, were employed. All tires had part of their top sidewalls removed. The habitats were readily deployed in Louisiana in two different regions of a marine embayment along the Gulf Of Mexico. The embayment was known to be inhabited by stone crabs. In May, 1989, the units were recovered and were found to contain stone crabs of commercial size.

We claim:

1. A stone crab habitat and harvesting apparatus self-supported on the water bottom in an aquatic environment comprising:
  (a) a first substantially round vehicular pneumatic tire casing and a plurality of succeeding substantially round vehicular pneumatic tire casings, said tire casings having a tread area at the outer radial edge and a pair of opposing sidewall areas located substantially perpendicular to said tread area so as to form a pneumatic space, each of said tire casings being oriented horizontally, so as to have one upper and one lower sidewall, said tire casings being positioned, one over the other, so as to form a vertical stack of said tire casings having said first tire casing in said stack resting on said water bottom on its lower sidewall and each said succeeding tire casing in said stack supported on the upper sidewall of the preceding tire casing in said stack;
  (b) means for attaching said tire casings together;
  (c) means for locating said stack of tire casings in said aquatic environment; and
  (d) means for pulling said stack of tire casings from said aquatic environment.

2. A stone crab habitat and harvesting apparatus as recited in claim 1, wherein said upper sidewall of each said tire casing is substantially removed so as to form an upper lip area adjacent to said tread area.

3. A stone crab habitat and harvesting apparatus as recited in claim 1, wherein said pneumatic space is filled with habitat enhancing material.

4. A stone crab habitat and harvesting apparatus as recited in claim 3, wherein said habitat enhancing material is stone.

5. A stone crab habitat and harvesting apparatus as recited in claim 3, wherein said habitat enhancing material is shell.

6. A stone crab habitat and harvesting apparatus as recited in claim 1, wherein said means for locating said stack of tire casings is a line attached to a buoy.

7. A stone crab habitat and harvesting apparatus as recited in claim 1, wherein said lower sidewalls of said tire casings have a plurality of drain holes.

8. A stone crab habitat and harvesting apparatus for self-support on a water bottom in an aquatic environment comprising:

(a) a plurality of substantially round vehicular pneumatic tire casings, said tire casings having a tread area at the outer radial edge and a pair of opposing sidewall areas located substantially perpendicular to said tread area so as to form a pneumatic space, said tire casings being oriented horizontally, so as to have one upper and one lower sidewall, and positioned one over the other, upper sidewall to lower sidewall, so as to form a vertical stack of said tire casings, said stack having a first tire casing resting on its lower sidewall and succeeding tire casings resting on the upper sidewall of each preceding tire casing in said stack;

(b) habitat enhancing fill material within said pneumatic space;

(c) a harness having a plurality of lines attached to said first tire casing in said stack, said succeeding tire casing being slidably mounted at fixed intervals to said harness lines;

(d) a buoy attached to said harness for locating said stack of tire casings in said aquatic environment;

(e) means for supporting said first tire casing in said stack above said water bottom; and (f) means for pulling said stack from said aquatic environment.

9. A stone crab habitat as recited in claim 8 wherein said habitat enhancing material is stone.

10. A stone crab habitat as recited in claim 8 wherein said habitat enhancing material is shell.

11. A stone crab habitat as recited in claim 8 wherein said habitat enhancing material is the valves of aquatic mollusks.

12. A stone crab habitat as recited in claim 8 wherein said tire casings have a plurality of drain holes in said lower sidewalls.

13. A stone crab habitat as recited in claim 8 wherein said upper sidewalls of said tire casings are substantially removed.

14. A method of providing a self-supported aquatic habitat on a water bottom for cultivating and harvesting stone crabs comprising the steps of:

(a) turning a plurality of tire casings, each having opposing sidewalls and a pneumatic space, on their side so as to have upper and lower sidewalls;

(b) providing a plurality of guide holes in said sidewalls of said tire casings;

(c) stacking said tire casings, beginning with a first tire casing and then succeeding tire casings, one over the other so as to form a vertical stack of said tire casings;

(d) fastening said first tire casing to a plurality of harness lines;

(e) threading said harness lines through said guide holes in said succeeding tire casings so as to allow said succeeding tire casings to slide along said harness lines;

(f) filling said pneumatic space of each tire casing with habitat enhancing material;

(g) resting said first tire casing on said water bottom to support said stack of tire casings on said water bottom;

(h) marking the location of said stack of tire casings by a buoy attached to a tether fastened to said harness lines; and (i) pulling said stack of tire casings off the water bottom and out of the water by means of said tether and said harness lines for harvesting said stone crabs.

15. A method of providing a self-supported aquatic habitat on a water bottom for cultivating and harvesting stone crabs as recited in claim 14, wherein said habitat enhancing material is shell.

16. A method of providing a self-supported aquatic habitat on a water bottom for cultivating and harvesting stone crabs as recited in claim 14, wherein said habitat enhancing material is stone.

17. A method of providing a self-supported aquatic habitat on a water bottom for cultivating and harvesting stone crabs as recited in claim 14, further comprising the steps of providing a plurality of stops at intervals along said harness lines said stops being greater in diameter than the width of said sidewall holes so as to engage said holes and suspend said tire casings at intervals along said harness lines when said stack of tire casings is pulled from said water bottom.

18. A method of providing a self-supported aquatic habitat on a water bottom for cultivating and harvesting stone crabs as recited in claim 14, further comprising the additional step of providing drain holes in said tire casings to allow water to flow through said holes to facilitate removing said stack of tire casings from said water.

19. A method of providing a self-supported aquatic habitat on a water bottom for cultivation and harvesting stone crabs as recited in claim 14, further comprising the step of partially removing said upper sidewalls of said tire casings.

* * * * *